UNITED STATES PATENT OFFICE.

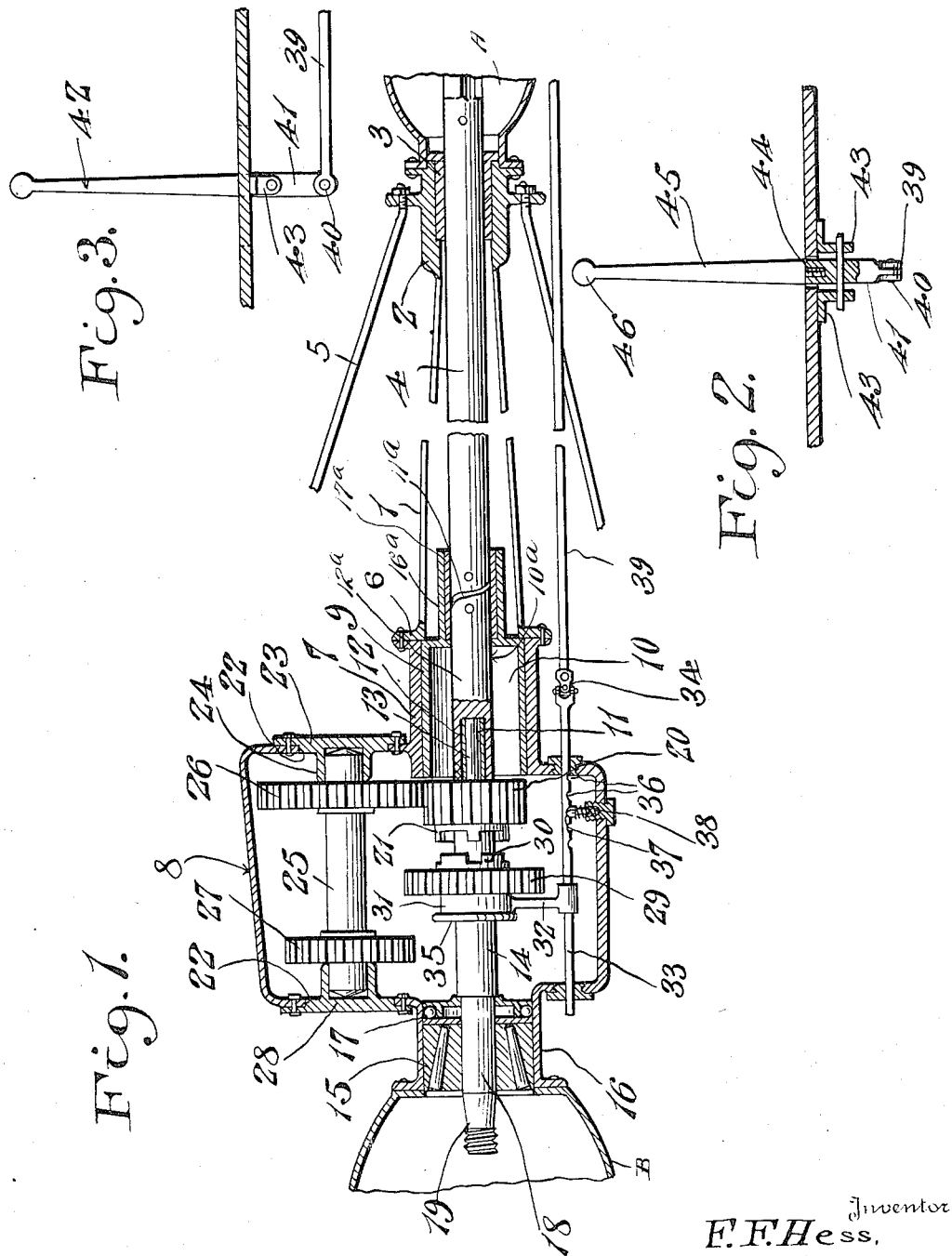

FRED F. HESS AND WALTER W. SCOTT, OF CHEHALIS, WASHINGTON, ASSIGNORS OF ONE-THIRD TO O. J. ALBERS, OF CHEHALIS, WASHINGTON.

ATTACHMENT FOR MOTOR-VEHICLES.

1,295,895.　　　　　　Specification of Letters Patent.　　Patented Mar. 4, 1919.

Application filed March 5, 1915. Serial No. 12,395.

*To all whom it may concern:*

Be it known that we, FRED F. HESS and WALTER W. SCOTT, citizens of the United States, residing at Chehalis, in the county of Lewis and State of Washington, have invented certain new and useful Improvements in Attachments for Motor-Vehicles; and we do hereby declare the following to be a full, clear, and exact description of the invention, such as will enable others skilled in the art to which it appertains to make and use the same.

This invention relates to an auxiliary transmission designed for attachment to a Ford motor car, which type of car embraces two forward speeds, namely, high and low and a single reverse speed.

The object of the invention is to form the driven shaft of the motor vehicle in two sections, the forward section having connection with the main transmission and the rear section being connected up to the differential, the said sections being adapted to have direct connection during the driving of the car at high or low speed, and at a reverse speed, or to have such connection that the section leading to the differential will be driven at varying speeds between the high and low speed and the reverse speed.

With these and other objects in view, the invention consists in the novel combination and arrangement of parts which will be fully set forth in the following specification and accompanying drawings, in which:

Figure 1 is a top view in section of an auxiliary transmission and the propeller shaft of a vehicle, Fig. 2 is a front view of the controlling lever showing the same partly in section to more clearly illustrate the details of construction, and Fig. 3 is a side view of Fig. 2.

Referring to the drawing by characters of reference, the numeral 1 designates an elongated housing for the driven shaft 4', which housing has its forward end provided with an enlargement 2, carrying a bearing 3 to receive one end of the driven shaft, which is connected to the change speed mechanism (not shown) adapted to be located in the casing A, which is connected to the enlargement 2. The enlargement 2 is connected to the body of the vehicle by the ordinary radius rods 5. The rear end of the housing 1 terminates in a flange 6, which is secured to the cylindrical extension 7 of the auxiliary transmission housing 8, which housing is provided with a suitable bearing sleeve 9 on which the roller bearings 10 run. The driven shaft 4 has connected thereto a shaft $10^a$, as shown at $11^a$, and consists of front and rear sections $12^a$ and 14. The rear end of the section $12^a$ is provided with an axial bore 11 for the reception of the bushing 12 which forms a bearing for the reduced extension 13 formed in the forward end of the rear section 14, and which is rectangular in cross section. The rear end of the rear section 14 is carried on the roller bearings 15, which are mounted on the cylindrical extension 16 at the rear end of the housing 8. A reduced cylindrical portion $16^a$, having bearings $17^a$, is formed on the bearing sleeve 9 and surrounds the connection $11^a$ between the front section $12^a$ and the driven shaft 4. A suitable thrust bearing 17 is carried in the extension 16, and the rear end of the section 14 is reduced, as at 18 and terminates in the tapered portion 19 which extends into a housing B, which incloses the differential gearing and has connection with the said gearing in any suitable manner. The bored end of the section $10^a$ extends partly into the housing 8 and carries the spur gear 20 which is formed with a suitable clutch section 21 on its rear face, the use of which will appear as the description proceeds.

The housing 8 is formed with a pair of alining apertures 22 in which the plugs 23 and 28 are secured, and these plugs are provided with the cylindrical extensions 24 which form bearings for the counter-shaft 25 on which the spur gear 26 is mounted. This spur gear meshes with the spur gear 20 as clearly shown and is used to drive the counter-shaft and the spur gear 27 when the device is in operation. A suitable plug 28, similar to the plug 23, is located in the aperture 22 in the rear end of the housing 8 and also forms a bearing for the counter-shaft. Slidable on the shaft section 14 is a suitable spur gear 29 which is formed with the clutch section 30, which clutch section is arranged to engage the clutch section 21 so that when the device is in high speed, the shaft section 14 will be driven at the same rate of speed as the shaft section $10^a$ is driven. A suitable boss 31 is carried on the arm 32, which is mounted on the slidable rod 33, which rod is formed at its forward end with a suitable universal joint 34, and this boss engages in a groove formed in the sleeve 35 carried by the gear 29. The rod 33 is formed with a plurality of depressions 36 which form notches in which the end of the latch 37 engages. This latch 37 is carried in the plug 38 and is spring-pressed so as to be in engagement with the walls of the notches and hold the gears in the desired position. Connected to the universal joint 34 is a suitable rod 39, the forward end of which is pivotally connected as at 40 to the lower end 41 of the lever designated generally by the numeral 42. This lever is pivotally mounted between the ears 43 and the lower portion 41 is formed with the axially threaded bore 44 in which the upper section 45 is threaded. This upper section terminates in the handle portion 46 and the whole is located within easy reach of the driver of the vehicle.

From the foregoing it will be apparent that in use when it is desired to stop the vehicle the lever 42 is set to the neutral position so that the gear 29 is in the position illustrated in Fig. 1. When in this position it will be apparent that any danger in cranking the motor is eliminated as there is no possible way for the car to start which frequently occurs without the use of this device as the clutch is apt to stick, due to the heavy oil used in connection therewith. In case the user wishes to travel at the usual rate of speed, the lever is shifted so as to pull the clutch section 30 into engagement with the clutch section 21 and thereby control the speed of the vehicle entirely from the engine and from the ordinary transmission. In case a heavy hill is encountered and it is necessary to shift the gear into intermediate position the lever is thrown in the opposite direction, and it will be apparent that the gear 29 will mesh with the gear 27 and the vehicle will be driven through the countershaft 25 and the gears 20 and 26. It will thus be seen that the speed will be reduced to a point intermediate the usual low speed and the ordinary high speed. After the vehicle is brought to a standstill the lever 42 may be shifted to a neutral position and in order to prevent unauthorized persons from using the car, the upper section 45 may be unscrewed from the lower section 41 and locked in the car or taken by the person using the vehicle. In this way it will be apparent that any attempt to steal the vehicle will be frustrated as power cannot be transmitted to the rear wheels unless the gear 29 is in mesh with the gear 27, or the clutch half 30 is in mesh with the clutch half 21.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A motor vehicle including a differential, a housing therefor, a driven shaft, a housing for said shaft having its rear end spaced from the differential housing, a casing interposed between said housings and secured to the differential housing, a cylindrical portion secured to the casing and to the drive shaft housing, a shaft consisting of front and rear sections journaled in the casing and connected to said driven shaft and differential, a bearing sleeve carried by said cylindrical portion, a reduced cylindrical portion formed upon said sleeve and surrounding the connection between the driven shaft and the shaft connected thereto, a bearing in said sleeve surrounding said connected shafts, an auxiliary speed changing gear in said casing, and means for controlling the speed changing gear.

In testimony whereof we affix our signatures in presence of two witnesses.

FRED F. HESS.
WALTER W. SCOTT.

Witnesses:
W. R. JOHNSON.
O. J. ALBERS.